United States Patent
Weiss et al.

[11] Patent Number: 5,180,695
[45] Date of Patent: Jan. 19, 1993

[54] LEAD OXIDE-FREE GLASS, PARTICULARLY FOR USE IN ELECTRIC LAMPS

[75] Inventors: Werner Weiss, Stadtbergen; Manfred Mair, Augsburg; Manfred Deisenhofer, Altenmuenster; Ewald Poesl, Kissing, all of Fed. Rep. of Germany

[73] Assignee: Patent Treuhand Gesellschaft fur Elektrische Gluhlampen m.b.H., Munich, Fed. Rep. of Germany

[21] Appl. No.: 713,126

[22] Filed: Jun. 10, 1991

[30] Foreign Application Priority Data

Jun. 11, 1990 [DE] Fed. Rep. of Germany ....... 4018682

[51] Int. Cl.$^5$ .............................................. C03C 3/091
[52] U.S. Cl. ........................................ 501/66; 501/69; 501/64; 313/636
[58] Field of Search .............. 501/70, 64, 66, 69; 313/493, 636

[56] References Cited

U.S. PATENT DOCUMENTS

| | | |
|---|---|---|
| 4,089,694 | 5/1978 | Thomas et al. |
| 4,105,826 | 8/1978 | Thomas ............................ 313/623 X |
| 4,354,139 | 10/1982 | Konijnendijk et al. ........ 313/636 X |
| 4,441,051 | 4/1984 | Thomas ............................ 313/636 X |
| 4,459,510 | 7/1984 | Joormann .......................... 313/636 |
| 4,666,871 | 5/1987 | Spierings et al. ............... 313/636 X |
| 4,737,685 | 4/1988 | Thomas ............................ 313/636 X |

OTHER PUBLICATIONS

Chemical Abstracts vol. 111, No. 16, Oct. 16, 1989, Columbus, Ohio Abstract No. 139426X, p. 327.
Chemical Abstracts vol. 95, No. 5, Sep. 1981, Columbus, Ohio No. 85052C, p. 252.
Chemical Abstracts vol. 83, No. 20; Nov. 17, 1976, Columbus, Ohio No. 167943K, p. 237.

Primary Examiner—Karl Group
Assistant Examiner—Chris Gallo
Attorney, Agent, or Firm—Frishauf, Holtz, Goodman & Woodward

[57] ABSTRACT

A lead oxide free glass of high electrical resistance, easy workability, that is, low abrasive characteristics, and a thermal coefficient of expansion compatible with electrical current supply leads, has an electrical resistance of $10^{12}$ ohm cm at 250° C., and, basically, the following composition:

$SiO_2$ 40-60%
$Al_2O_3$ 2-5%
$CaO$ 5-10%
$BaO$ 20-30%
$V_2O_5$ 2-5%
$K_2O$ 5-7%
$B_2O_3$ 0-5% and additives comprising at least one of MgO, $B_2O_3$, each present between 0 and about 5%.

14 Claims, 1 Drawing Sheet

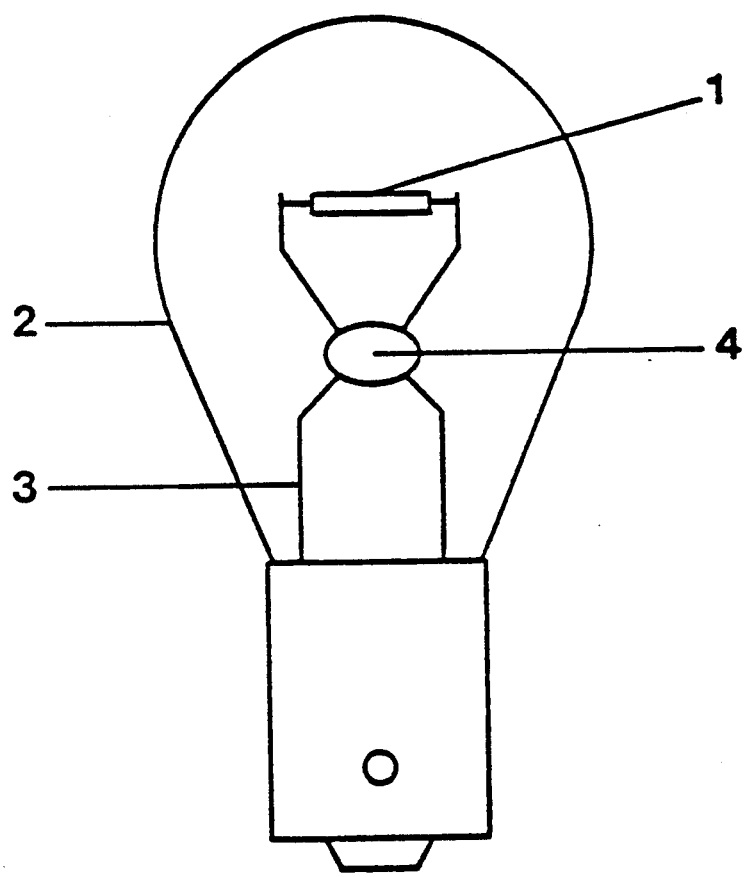

5,180,695

LEAD OXIDE-FREE GLASS, PARTICULARLY FOR USE IN ELECTRIC LAMPS

Reference to related patent, the disclosure of which is hereby incorporated by reference: U.S. Pat. No. 4,089,694, Thomas et al.

FIELD OF THE INVENTION

The present invention relates to a glass which is free from lead oxide and which is especially adapted for use in the electrical and vacuum technology field, especially in electric lamps, and particularly when used as glass powder which is subsequently sintered, so that the resulting glass body will be mechanically strong, vacuum-tight, electrically stable, and have high electrical resistance and a thermal coefficient of expansion which is such that it can be used in combination with electric current supply leads passing through the glass body.

BACKGROUND

Glasses which are low in lead oxide compounds or free from lead oxide components are known, see for example the referenced U.S. Pat. No. 4,089,694, Thomas et al. Such glasses are used in the electrical and vacuum technology field, for example in electric lamps. One frequent use of glasses of this type is in glass bodies which are made from pressed glass powder which is subsequently sintered. Such form bodies are used as sealing parts for current supply leads, in which mechanical vacuum and electrical stability are particularly important characteristics.

Soft glasses as well as hard glasses can be used, in dependence on the respective requirements of the article and shaping methods, the type and composition of metallic components which are to be melted-in into the glass body, and the required electrical insulation resistance of the glasses.

Highly insulating glasses, for example, are hard glasses of the Pyrex ® type. Such glasses have thermal coefficients of expansion of about $4 \times 10^{-6}/K$. They are low in lead oxide. Other types of glasses are soft glasses, having thermal coefficients of expansion of $9-10 \times 10^{-6}/K$. These soft glasses usually have up to about 40% lead oxide.

In the specification and claims that follow, all proportions will be given by weight, unless noted otherwise.

The referenced U.S. Pat. No. 4,089,694, Thomas et al, describes a low lead oxide soft glass for electrical apparatus, which has the following composition:

65-75% $SiO_2$
9-13% $Na_2O$
3-6% $K_2O$
1-4% $Al_2O_3$
4-8% CaO
0-4% BaO
0-6% PbO
0-2% $Li_2O$
0-1% F.

The relative proportion between $Na_2O$ and $K_2O$ will depend on the CaO quantity which is used and is a substantial characteristic of this glass. This proportion has to be carefully selected. In this glass, the CaO acts partially as a replacement for the PbO. The referenced patent describes in detail the reason for replacing PbO as much as possible, and also stresses the health hazards if a high proportion of the toxic lead oxide is used.

It has been found that the low lead oxide glass has restricted utility, since for many uses the electrical resistance is too low. At 250° C., it is, typically, $10^7$ to $10^{8.5}$ ohm cm. If such glasses are used as shaped bodies made of ground glass which has been sintered, the abrasive characteristic of the glasses, upon pressing the glass powder, has the tendency to grind off the compression dies, so that the forming molds or forming dies have to be frequently reworked, resurfaced, or even renewed. This problem could be solved by raising the lead oxide content which, however, is environmentally unacceptable.

THE INVENTION

It is an object to provide a low lead oxide and, preferably, completely lead oxide free glass, which can be readily worked at low temperature on high-speed machinery, while retaining a high electrical specific resistance.

Briefly, the glass in accordance with the present invention has the following composition:

$SiO_2$ 40-60%
$Al_2O_3$ 2-5%
CaO 5-10%
BaO 20-30%
$V_2O_5$ 2-5%
$K_2O$ 5-7%
$B_2O_3$ 0-5%.

DRAWING

The single FIGURE is a highly schematic side view of an automotive-type brake light bulb.

DETAILED DESCRIPTION

The single FIGURE, highly schematically, illustrates an automotive brake light bulb, for example a bulb of the standard type 93. The bulb has a base of standard construction, a tungsten filament 1, a bulb 2, and two current supply leads 3 extending through the bulb 2 into the evacuated interior thereof. The filament 1 is supported by the current supply leads 3. The current supply leads 3 are made of an iron-nickel alloy. They are bent towards each other and there connected by a glass connecting element 4, in order to mechanically and electrically stabilize the current supply leads, which extend from the base into the bulbous portion of the bulb 2. The element 4 is a glass ring or a glass bead made of sinter glass which, in accordance with the present invention, has a composition to be described in detail.

The specific glass composition used for the bead or ring 4 has the advantage that its thermal coefficient of expansion is ideally matched to that of the current supply leads, so that vacuum-tight connecting elements, in which electrically conductive parts are melted-in, can readily be made by the glass of this composition. Other metals, or other metal alloys, can also be used with the glass composition in accordance with the present invention.

The application of the present invention is not restricted to automotive bulbs of the type shown. It is particularly suitable for small incandescent lamps, as, well as fluorescent lamps, which are connected to power networks at customary power network voltages of, for example, 110 V, or 220 V.

In accordance with a feature of the present invention, the composition of the glass has a much lower content of $SiO_2$ than the prior art and does not use $Na_2O$ at all. The $SiO_2$ content is in the order of about 40-60%; a minor proportion of the $SiO_2$, for example up to about 5%, may be replaced by $B_2O_3$. There are small proportions of the oxides of aluminum and calcium; rather high proportions of BaO (20-30%) and $K_2O$ (5-7%) and a significant proportion of $V_2O_5$ (2-5%) are used. In accordance with a particularly preferred feature of the composition in accordance with the invention, the combined quantity of BaO and $V_2O_5$ is placed between 25 and 35%.

Vanadium oxide is known to be toxic. Yet, its vapor pressure is less by 1-2 orders of magnitude of that of lead oxide, so that any concentrations of $V_2O_5$ at the manufacturing locations are substantially lower by a factor of at least 10 below the permissible limits for a safe operating surrounding.

Glasses in which the oxides of the alkaline earth metals, Ba, Ca, and possibly up to 5% Mg, exceed the content of vanadium oxide by 8-12 times give the glass particularly good characteristics. The potassium oxide proportion of between 5-7% is used to fine-tune the thermal coefficient of expansion. The proportion of CaO and MgO together is, preferably, between about 5-15%.

The glass may have a small additive of boron oxide—up to about 5%—in order to fine-tune the viscosity thereof.

The glass has excellent physical characteristics without incurring disadvantages of other characteristics. This is particularly marked when the glass is used in sinter bodies, such as the bodies 4 of the lamp of the figure, where it forms a connecting element between current supply leads.

The connecting element 4 for the current supply leads 3 is made by pressing a glass powder. It has been found, surprisingly, that the glass has a lower abrasion characteristic, that is, its hardness as a grinding substance is less than prior art glasses. To make glass less abrasive, it would be obvious to increase the lead oxide content. The present invention departs from this well known step and, rather, goes in an opposite direction, by completely eliminating lead oxide. The glass, in accordance with the present invention, has the low abrasion characteristics of known lead crystal glasses which, typically, contain a lead oxide proportion of between 20-40%. In known low lead oxide Pyrex ® type glasses, the abrasion hardness is higher by 2-3 times that of the lead oxide glasses, so that molding dies for molding or pressing glass powder are subject to excessive wear.

The low abrasive characteristic of the glass is believed to be due to the low $SiO_2$ and $B_2O_3$ proportion in combination with the relatively high $K_2O$ and BaO proportion. It has been found, surprisingly, that a significant addition of $V_2O_5$, as a replacement for $SiO_2$, for example up to about 5%, also desirably influences the hardness or abrasion characteristics of the glass, without, however, undesirably influencing the electrical resistance of the glass.

The following composition has been found particularly suitable:
$SiO_2$ 48-52%
$Al_2O_3$ 3-4%
MgO 3-4%
CaO 5-6%
BaO 26-28%
$V_2O_5$ 3.5-4.5%
$K_2O$ 6-7%

The glass has the additional advantage that it can be readily handled within a narrow temperature range. The lowest temperature is determined by the vaporization speed of the binder necessary to form the press body. This binder must be completely removed from the blank body which is being pressed before sintering temperature is reached. The highest permissible sintering temperature is determined by the temperature of the further working of the blank and the characteristics of the sinter furnace. A typical sinter furnace, which affects its characteristics, is a continuous sinter furnace, with support belts continuously passing through the furnace, on which adhesion of the sinter bodies must be prevented. The temperature of further processing depends primarily on the material which is melted-in into the sinter body.

The lead oxide free glass has an extremely high electrical resistance of about $10^{12}$ ohm cm at 250° C. This, previously, could be obtained only in low alkali lead oxide containing hard glasses.

The glass has the additional surprising and excellent characteristic of low temperature coefficient of electrical resistance, which is less than half of that of lead oxide containing glasses. As the temperature increases, the electrical resistance decreases markedly. At elevated temperatures of, for example, 600° C. or more, even "soft" lead containing glasses no longer provide sufficient electrical insulation when softened to liquid state, although, when completely solid, they provide good insulation.

Sintered beads or rings made of lead crystal glasses having more than 24% lead oxide have a temperature drop of resistance of about 3% per degree Kelvin temperature increase when the glass has a resistance of $10^6$ ohm cm. The glasses in accordance with the present invention, in contrast, have a resistance decrease which is only in the order of between 1.5-2% per degree Kelvin temperature increase. The decrease in resistance was measured when the glass was in liquid state at a temperature of 1000° C. The viscosity, at 150 ohm cm, was $10^3$ d pas.

The lead oxide free glass in accordance with the present invention is made by melting the composition in boats at 1400°-1450° C. The glass melt can be poured or formed into frit. Boats which are basically alkaline are suitable; they are less attacked by the highly alkaline melt than boats which are acidic. Boric acid can be used to control and fine-tune or adjust the viscosity. When replacing a proportion of $SiO_2$ by boric acid, neither the abrasion hardness, nor the electrical resistance, nor the thermal coefficient of expansion of the glass is measurably affected.

A glass composition made of seven raw materials has been found particularly suitable:
$SiO_2$ 50.2%
$Al_2O_3$ 3.4%
MgO 3.6%
CaO 5.3%
BaO 26.7%
$V_2O_5$ 4.0%
$K_2O$ 6.8%

This glass has the following characteristics:
thermal coefficient of expansion $9 \times 10^{-6}$/K. ($\pm 0.2 \times 10^{-6}$)
transformation temperature 620° C. ($\pm 10°$ C.)
softening temperature 820° C. ($\pm 10°$ C.)
working temperature 1075° C. ($\pm 15°$ C.)
density 3.0 g/cm$^3$ ($\pm 0.1$ g/cm$^3$)

Specific resistance at various temperatures (±10° C.)
$10^{12}$ Ωcm: 250° C.
$10^8$ Ωcm: 480° C.
$10^4$ Ωcm: 900° C.
$10^3$ Ωcm: 1036° C.

We claim:

1. A glass body, wherein the glass of the glass body has high electrical resistance, said glass body consisting essentially of
    $SiO_2$ 40–60%
    $Al_2O_3$ 2–5%
    CaO 5–10%
    BaO 20–30%
    $V_2O_5$ 2–5%
    $K_2O$ 5–7%
    $B_2O_3$ 0–5%
    wherein all percentages are given by weight.

2. The glass of claim 1, wherein the combined proportion of BaO and $V_2O_5$ is between about 25 and 35%.

3. The glass of claim 1, wherein said glass additionally contains up to about 5% MgO.

4. The glass of claim 3, wherein the combined proportion of CaO and MgO is between about 5 and 15%.

5. The glass of claim 1, wherein the weight relationship between the combined proportions of CaO, BaO, and optionally MgO on the one hand, and the proportion of $V_2O_5$ on the other is between about 8–12.

6. The glass of claim 1, wherein the $SiO_2$ proportion is replaced in part by up to 5% of $B_2O_3$.

7. The glass of claim 1, wherein the glass has the following composition:
    $SiO_2$ 48–52%
    $Al_2O_3$ 3–4%
    MgO 3–4%
    CaO 5–6%
    BaO 26–28%
    $V_2O_5$ 3.5–4.5%
    $K_2O$ 6–7%.

8. The glass of claim 1, wherein the glass has the following composition
    $SiO_2$ 50.2%
    $Al_2O_3$ 3.4%
    MgO 3.6%
    CaO 5.3%
    BaO 26.7%
    $V_2O_5$ 4.0%
    $K_2O$ 6.8%.

9. Lead oxide free glass, particularly for electrical apparatus, said glass consisting essentially of
    $SiO_2$ 40–60%
    $Al_2O_3$ 2–5%
    CaO 5–10%
    BaO 20–30%
    $V_2O_5$ 2–5%
    $K_2O$ 5–7%
    $B_2O_3$ 0–5%
    and additives comprising at least one of MgO, $B_2O_3$, each present between 0 and about 5%.

10. The glass of claim 9, wherein the combined proportion of BaO and $V_2O_5$ is between about 25 and 35%.

11. The glass of claim 9, wherein the combined proportion of CaO and MgO is between about 5 and 15%.

12. The glass of claim 9, wherein the weight relationship between the combined proportions of CaO, BaO, and optionally MgO on the one hand, and the proportion of $V_2O_5$ on the other is between about 8–12.

13. The combination of an electrical device with the glass body of claim 1, wherein the electrical device comprises a lamp having a bulb, and said glass body located within said bulb.

14. The combination of an electrical device with the glass body of claim 1, wherein the electrical device includes an electrically conductive means, said electrically conductive means being melted in said glass body.

* * * * *